United States Patent [19]

Park

[11] Patent Number: 4,581,383

[45] Date of Patent: Apr. 8, 1986

[54] LIGHTLY CROSSLINKED LINEAR OLEFINIC POLYMER FOAM BLENDS AND PROCESS FOR MAKING

[75] Inventor: Chung P. Park, Pickerington, Ohio

[73] Assignee: The Dow Chemical Company, Midland, Mich.

[21] Appl. No.: 773,010

[22] Filed: Sep. 6, 1985

Related U.S. Application Data

[62] Division of Ser. No. 725,036, Apr. 19, 1985.

[51] Int. Cl.$^4$ .................................................. C08J 9/14
[52] U.S. Cl. ................................... 521/91; 264/53; 521/79; 521/81; 521/134; 521/135; 521/138; 521/139; 521/143; 521/146; 521/154
[58] Field of Search ............... 521/79, 81, 91, 134, 521/138, 139, 154; 264/53

[56] References Cited

U.S. PATENT DOCUMENTS

| | | | |
|---|---|---|---|
| 4,102,829 | 7/1978 | Watanabe et al. | 521/81 |
| 4,160,072 | 7/1979 | Shinkai et al. | 521/96 |
| 4,215,202 | 7/1980 | Park | 521/98 |
| 4,226,946 | 10/1980 | Park et al. | 521/98 |
| 4,252,906 | 2/1981 | Hosokawa et al. | 521/154 |
| 4,331,779 | 5/1982 | Park | 521/134 |
| 4,333,898 | 6/1982 | Schmidtchen | 521/79 |
| 4,413,066 | 11/1983 | Isaka et al. | 521/149 |
| 4,454,086 | 6/1984 | Corbett et al. | 264/53 |
| 4,456,704 | 6/1984 | Fukamura et al. | 521/79 |

FOREIGN PATENT DOCUMENTS

1408154 10/1975 United Kingdom .

Primary Examiner—Morton Foelak

[57] ABSTRACT

An expandable blend of a linear olefinic polymer and a crosslinkable polymer for production of lightly crosslinked foamed polymers and a process for the preparation thereof is provided. The presence of a crosslinkable polymer component in the blend increases the melt strength of the linear olefinic component so that conventional melt processing techniques may be utilized to produce foamed polymers. Both open and closed cell foams may be produced.

5 Claims, 2 Drawing Figures

LIGHTLY CROSSLINKED LINEAR OLEFINIC POLYMER FOAM BLENDS AND PROCESS FOR MAKING This is a divisional of U.S. application Ser. No. 725,036, filed Apr. 19, 1985.

This invention relates to polymer foam materials made from blends of a linear olefinic polymer and a crosslinkable polymer.

It is known to make low density ethylenic polymer resin foams by the process of extrusion foaming, wherein a normally solid thermoplastic ethylenic polymer resin such as a low density branched ethylenic polymer resin, for example, low density branched polyethylene, is melt processed and mixed under pressure with a volatile blowing agent to form a flowable gel. The gel is then passed through a shaping orifice or die opening into a zone of lower pressure. As the pressure is lowered, the volatile constituent of the gel vaporizes, forming cells in the resin structure which cools to a cellular foam material.

Linear olefinic polymers, such as linear low density polyethylene, have several properties which make their use in foams desirable. For example, a linear low density polyethylene has a higher modulus of elasticity, greater toughness, higher heat distortion temperature, and lower permeability to blowing agents than branched ethylenic polymers. However, previous attempts to produce low density foams of linear olefins by extrusion processes have been largely unsuccessful. Linear olefins, when foamed by an extrusion process, suffer from small foam cross-section, flow instability, and a narrow range of foaming temperatures. Indeed, under some conditions, linear olefins will not foam.

The exact cause of problems of foaming linear polyolefins is not fully known. However, it is generally believed that poor melt strength together with a sharp change in melt viscosity near the transition temperature makes extrusion foaming of linear olefins difficult. With these properties, it is difficult to control bubble expansion during extrusion and under conditions of heat and high shear stresses.

It is also known that relatively lightly to moderately crosslinked thermoplastic polymers have melt properties that are suitable for foam expansion. However, such crosslinked polymers are difficult to process on conventional melt processing apparatus such as extruders because of flow instability. At a result, most research work has been directed toward production of crosslinked polymer compositions expandable during postextrusion secondary foaming. Recently, however, advances have been made in overcoming some of the problems involved.

For example, Corbett, U.S. Pat. No. 4,454,086 (assigned to the assignee of the present invention), discloses making crosslinked styrene polymer foams by an extrusion process. Corbett teaches that a styrene acrylic acid (SAA) copolymer may be lightly crosslinked in a foam extrusion line with a multi-functional epoxy resin. Additionally, in my own commonly-assigned copending applications entitled, "Alcohol Control of Lightly Crosslinked Foamed Polymer Production", Ser. No. 672,101, filed Nov. 16, 1984 and "Lightly Crosslinked Linear Olefinic Polymer Foams and Process for Making", Ser. No. 672,001, filed Nov. 16, 1984, there are disclosed expandable ethylenic and styrenic polymer compositions and crosslinking agents for controllably crosslinking the polymers prior to extrusion foaming.

Other efforts to produce foams from linear polyolefins have centered around blending a linear polyolefin with another olefin polymer having good extrusion foamability. For example, Park et al, U.S. Pat. No. 4,226,946, blended a linear polyethylene with a low density branched polyethylene to improve extrusion foamability of the linear polyethylene. Watanabe et al, U.S. Pat. No. 4,102,829, blended an ionomer resin with a linear polyethylene for the same purpose. Additionally, in my own commonly-assigned copending application entitled "Foams of Ionically Associated Blends of Styrenic and Ethylenic Polymers", Ser. No. 653,420, filed Sept. 24, 1984, there is disclosed an ionically associated blend of salts of styrene/acrylic acid and ethylene/acrylic acid copolymers to produce a foam.

SUMMARY OF THE INVENTION

The present invention provides a polymeric foam made from a blend of a linear olefin, such as linear low density polyethylene, and a crosslinkable polymer having one or more reactive carboxylic acid, amide, amine, or hydroxyl functional groups. The presence of a crosslinkable polymer in the blend improves the melt strength of the linear polyethylene so that a foam can be produced using standard melt processing apparatus. The blend also contains a volatile blowing agent and a crosslinking agent. Optionally, the blend also includes a sufficient amount of an alcohol, such as an aliphatic alcohol having from 1 to 4 carbon atoms, to control and/or delay the reversible gas-yielding crosslinking reaction. The foam material produced exhibits the desirable properties of a linear olefin such as higher strengths and higher heat distortion temperatures than corresponding branched-chain olefin foams of equivalent densities.

The linear olefin and crosslinkable polymer blend comprise from about 5 to 95% by weight of a linear olefin such as linear low density polyethylene and from about 95 to 5% by weight of a crosslinkable polymer such as copolymers of (a) an ethylenic or other olefinic monomer and (b) ethylenically unsaturated comonomers such as carboxylic acids, alcohols or other monomers having reactive hydroxyl groups, amines, and amides. Of course, other linear olefinic polymers such as linear high density polyethylene, polypropylene, and polystyrene may be utilized as the linear olefinic component of the blend. The blowing agent may be selected from conventional volatile blowing agents such as a fluorocarbon, chlorocarbon, and fluorochlorocarbon compounds. Such blowing agents may also include other known hydrocarbons and alcohols.

The crosslinking agents found to be useful in the practice of the present invention include epoxy and aminofunctional silanes, organofunctional alkoxysilanes, and multiepoxyfunctional resins. Additionally, titanate compounds such as titanium alkoxides and other titanate coupling agents as well as amino-functional crosslinking agents are also useful.

In processing the foam, the blend of linear low density polyethylene and crosslinkable polymer is melt processed in a conventional manner by feeding, melting, and metering it in a conventional melt processing apparatus such as an extruder. The volatile blowing agent and crosslinking agent, and optionally a sufficient amount of an alcohol, are mixed into the blend under pressure to form a flowable gel or admixture.

As the flowable gel or admixture is extruded through the die opening in the extruder to a zone of lower pressure, the volatile blowing agent activates to expand the polymer blend to a foam structure, which is lightly crosslinked to itself. Foams having densities of between 0.6 and 15.0 pounds per cubic foot (pcf) (0.01 to 0.24 gm/cc) may be produced. Foams having open or closed cell structures may be produced by varying reaction conditions and/or the starting polymer blend.

The polymer blend has improved melt strength, and the resulting polymer foams have good dimensional stability and higher heat distortion temperatures than comparable branched-chain olefin foams. The foams of the present invention are useful as sound insulation panels, structural foams, cushioning packaging material, thermocollapse resistant films, and crosslinked jackets for cables and wires. Additionally, open cell structure foams of the present invention may find use as sound insulation materials as well as filter materials for the chemical, pharmaceutical, and tobacco industries.

Accordingly, it is an object of the present invention to provide blends of linear olefinic polymer and crosslinkable polymer compositions, and processes which can be utilized to expand such blends to useful foamed materials, using conventional melt processing techniques. This, and other objects and advantages of the present invention, will become apparent from the following detailed description, the accompanying drawings, and the appended claims.

DETAILED DESCRIPTION OF THE PREFERRED EMBODIMENTS

Figure 1:
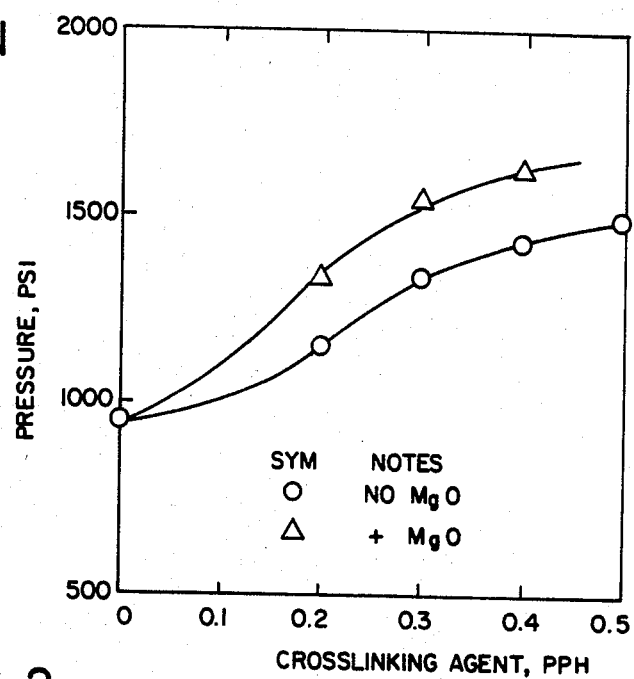
FIG. 1 is a graph of the effect of an epoxy functional silane crosslinking agent on extruder discharge pressure for a 50/50 blend by weight of a linear low density polyethylene (melt index of 2.0 and density of 0.926 gm/cc) and a copolymer of ethylene and acrylic acid.

The process and composition of the present invention permit the production of low density foam material by an extrusion process from a linear low density olefinic polymer by blending with it a crosslinkable polymer. This provides a foam having the desirable properties of linear low density olefins, such as higher temperature resistance and higher heat distortion temperatures than branched-chain olefin foams of equivalent density. The present invention is also unique in that by varying the process conditions and/or starting polymer blend, the structure of the foam produced can be open cell or have substantial numbers of closed cells.

The polymer blend of the present composition comprises from about 5 to 95% by weight of a linear olefin such as linear low density polyethylene (LLDPE) and from about 95 to 5% by weight of a crosslinkable polymer. A most preferred range in the practice of this invention is from 40-70% by weight linear olefin to 60-30% by weight of the crosslinkable polymer. The crosslinkable polymer may be a copolymer of (a) an ethylenic or other olefinic monomer with (b) an ethylenically unsaturated monomer having a carboxylic acid functional group, a hydroxyl group, or an amine or amide group. The monomers may be combined in the copolymer in any way, e.g., as random copolymer, as block or sequential copolymers, or as graft copolymers. Materials of these kinds and methods of making them are readily known in the art. Most preferred as the crosslinkable polymer component of the blend are copolymers of ethylene and acrylic acid. These crosslinkable polymers improve the melt strength of the linear low density olefinic component of the blend and permit successful foam extrusion on conventional melt processing apparatus.

The blowing agents useful in the practice of the present invention are well known and may comprise solids which decompose into gaseous products at extrusion temperatures or volatile liquids. A preferred class of blowing agents is the group of halogenated hydrocarbon compounds having from 1 to 4 carbon atoms. Dichlorodifluoromethane (FC-12), trichloromonofluoromethane (FC-11), and 1,2 dichlorotetrafluoroethane (FC-114) are most preferred. When these halogenated hydrocarbon compounds are used as the blowing agent, there can be from about 0.013 to 0.50 gram mole, and preferably about 0.040 to 0.30 gram mole of such blowing agent per 100 grams of polymer resin blend in the flowable gel or admixture. Mixtures of such blowing agents may also be used.

The blowing agent is compounded into the flowable gel in the melt processing apparatus in proportions to make the desired degree of expansion in the resulting foamed cellular product to make products having foamed densities down to about 0.6 pounds per cubic foot (pcf) (0.01 gm/cc). Depending on the amount of blowing agent added, the resulting foamed materials may have densities from about 0.6 to 15.0 pcf (0.01 to 0.24 gm/cc).

Crosslinking agents useful in the practice of the present invention include epoxy and amino functional silanes, organofunctional alkoxy silanes, multiepoxyfunctional resins, titanates, and amines. These crosslinking agents react with the crosslinkable polymer component of the blend to form lightly crosslinked bonds. This light crosslinking of the polymer blend improves melt strength and permits successful foam extrusion on conventional melt processing equipment.

Some of the crosslinking agents used in the practice of the present invention form crosslinking bonds by a reaction which releases an alcohol. For example, alkoxy functional silane crosslinking agents graft on ethylenic polymers having carboxylic acid groups to form acyloxy silane linkages with the release of alcohol. Likewise, amino and epoxyfunctional silanes graft on polymers having carboxylic acid or anhydride groups, again with the release of alcohol. The presence of alcohol in the foam extrusion line may be used to control the crosslinking reaction, effectively delaying crosslinking until the polymer blends exits the extrusion die.

The preferred silane crosslinking agents are organofunctional silanes of the general formula $RR'SiY_2$, where R represents an epoxy or amine functional radical attached to silicon through a silicon carbon bond and composed of carbon, hydrogen, and optionally oxygen or nitrogen, Y represents a hydrolyzable organic radical, and R' represents a hydrocarbon radical of Y. Alternatively, the silane may be an alkoxy silane of the general formula $R_aSi(OR')_b$, where "a" is 1 or 2 and "b" is 2 or 3, R is methyl or an organoreactive alkyl group, and OR' is a hydrolyzable alkoxy group.

Preferred multiepoxyfunctional resins include an epoxy novolac resin, D.E.N. 431, commercially available from the Dow Chemical Company. Such multiepoxyfunctional resins have multiple epoxy functional reaction sites which will react with carboxylic acid functional groups on the crosslinkable polymer.

The preferred titanate crosslinking agents are titanium alkoxides of the general formula Ti(OR)$_4$, where R is an alkyl group of from 1 to 18 carbon atoms, or titanium coupling agents of the general formula (RO)$_m$-Ti(O—X—R$_2$—Y)$_n$, where R is an alkyl group, X is carbonyl, R$_2$ is a long chain of carbon atoms, Y is a reactive double bond or amino, and "m" and "n" are integers which total 4. The most preferred titanate coupling agents are titanium isopropoxide and tetramethyl titanate. These titanate crosslinking agents react with carboxylic acid or hydroxyl functional groups on the crosslinkable polymer releasing alcohols.

Preferred amino crosslinking agents are hexamethoxymethylmelamine (HMMM) and alkylated glycolurilformaldehyde resins. These amino crosslinking agents react with hydroxy, carboxylic acid, or amide functional groups on the crosslinkable polymer.

The crosslinking agents of the present invention are added to the polymer gel blend with the blowing agent and react with the crosslinkable polymer component of the blend. This crosslinking increases the melt tension and melt viscosity of the gel, while permitting the polymer to remain flowable. As explained above, some of the crosslinking agents used in this invention form alcohols as the result of the crosslinking reaction and act to limit the degree of crosslinking. However, in such instances the crosslinking reaction proceeds during foam expansion at the exit of the die as the alcohol diffuses into the gaseous phase with the volatile blowing agent. Optionally, an alcohol may be added to the blowing agent to control further the crosslinking reaction. Preferably, such alcohols are of low molecular weight having from 1 to 4 carbon atoms such as methanol, ethanol, isopropanol and butanol.

In accordance with the process of the present invention, foams of a blend of a linear olefinic polymer with a crosslinkable polymer may be made on conventional melt processing apparatus such as by continuous extrusion from a screw-type extruder. Such an extruder typically comprises a series of sequential zones including a feed zone, compression and melt zone, metering zone, and mixing zone. The barrel of the extruder may be provided with conventional electric heaters for zoned temperature control.

An inlet is provided for adding a mixture of fluid blowing agent and crosslinking agent under pressure to the polymer blend in the extruder barrel between the metering and mixing zones. Crosslinking agent is pumped, in a controllable manner, into the stream of fluid blowing agent upstream of the injection nozzle. The blowing agent and crosslinking agent are compounded into the starting polymer in a conventional manner to form a flowable gel or admixture, preferably in a continuous manner. Thus, the polymer blend, blowing agent, and crosslinking agent may be combined in the mixing zone of an extruder using heat to plastify the polymer resin, pressure to maintain the blowing agent in a liquid state, and mechanical working to obtain thorough mixing.

The discharge end of the mixing zone of the extruder is connected, through a cooling and temperature control zone, to a die orifice. The hot polymer gel is cooled and then passed through the die orifice into a zone of lower pressure (e.g. normal ambient air atmosphere) where the blowing agent is activated and the polymer gel expands to a lower density, cellular mass. As the foamed extrusion forms, it is conducted away from the die and allowed to cool and harden.

In practice, the temperature of the feed zone is maintained at 180°±20° C., the temperature of the melting, metering, and mixing zones is maintained at 210°±20° C., and the temperature in the cooling and temperature control zone is maintained at 120°±20° C. The temperature of the polymer gel as it expands through the die orifice is preferably just above the temperature at which solid polymer would crystallize out of the gel and will vary depending upon the particular polymer blend utilized. For example, the crosslinkable polymer component of the blend may be selected so that it has a lower melting point than the linear olefinic polymer. Operation at near the freezing point of the linear olefin will still be above the melting point of the crosslinkable polymer, resulting in the polymer gel remaining flowable.

The resulting linear olefinic polymer blend foams are flexible to bending and shaping. The foams have excellent dimensional stability and higher compressive strengths and heat distortion temperatures than branched low density polyethylene foams having an equivalent foam density.

A unique aspect of the present invention is the ability to control the foaming process parameters so that excellent quality foams having either open or closed cell structures may be produced from the starting polymer blends. Ordinarily, it is quite difficult to produce foams having an open cell structure by an extrusion process. Open cell foams have unique properties which render them useful as sound insulation materials and filter media for a variety of end uses. Of course, foams with a substantially closed cell structure have other known uses including use as cushion packaging material.

The percentage of closed cells formed in the final foams is controlled by varying the operating temperature of the extrusion process. Excellent quality open cell foams are produced by operating the cooling zone of the extruder at a temperature slightly (e.g., 2°–4° C.) above the freezing point of the linear olefinic component of the polymer blend. Lowering the temperature in the cooling zone toward the freezing point of the linear olefinic component produces foams having a higher degree of closed cells.

As is conventional, finely divided solid materials such as talc, calcium silicate, zinc stearate, and the like can advantageously be incorporated with the polymer gel prior to expansion. Such finely divided materials aid in controlling the size of the cells and may be employed in amounts up to five percent by weight of the polymer. Numerous fillers, pigments, lubricants, antioxidants and the like well known in the art can also be incorporated as desired.

The specific working examples that follow are intended to illustrate the invention but are not to be taken as limiting the scope thereof. In the examples, parts and percentages are by weight unless otherwise specified or required by the context.

EXAMPLE I

The apparatus used in this example is a 1¼" (31.75 mm) screw type extruder having two additional zones for mixing and cooling at the end of usual sequential zones for feeding, melting and metering. An opening for blowing agent injection is provided on the extruder barrel between the metering and mixing zones. A small syringe-type pump is connected to the blowing agent stream for additive injections. At the end of cooling zone, there is attached a die orifice having an opening of rectangular shape. The height of the opening, called die gap hereinafter, is adjustable while its width is fixed at 0.25" (6.35 mm).

In this example, it is shown that a high temperature-resistant linear polyolefin foam blend can be produced from a blend of a linear low density polyethylene and an ethylene/acrylic acid copolymer. Thus, the polymer used in this example is a 50/50 by weight blend of a linear low density polyethylene, Dowlex 2032 (2.0 melt index, 0.926 g/cc density) a granular copolymer of acrylic acid with ethylene (2.0 melt index and 6.5% acrylic acid). Throughout the tests in this example, a rated, a reasonably good looking foam of substantially open cell structure was obtained. Dimensional stability of the open cell foam was good. Further increases in the amount of crosslinking agent, however, made the foam strand unstable. That is, the foam strand became wobbly and in extreme cases fractured. Note that addition of crosslinking agent raised the extruder discharge pressure as much as 600 psi.

Addition of methanol dramatically reduced the line pressure as seen in Tests 9 and 10. Also, addition of methanol cured the flow instability of the extruder and further resulted in good foams having substantially closed-cell structure. FIG. 1 illustrates the effects of the amount of crosslinking agent and the presence of magnesium oxide on the extruder discharge pressure.

TABLE I

| TEST NO. | BA LEVEL (1) | MgO LEVEL (2) | Z-6040 LEVEL (3) | MeOH LEVEL (4) | GEL TEMP. (5) | EXTRUD. PRES. (6) | FOAM DENSITY (7) | CELL SIZE (8) | OPEN CELL (9) | DIMEN-SIONAL STABILITY (10) | FLOW STABILITY (11) |
|---|---|---|---|---|---|---|---|---|---|---|---|
| 1 | 22.1 | 0 | 0 | 0 | 118.5 | 69.5 | — | — | — | — | Foam Collapses |
| 2 | 21.0 | 0 | 0.2 | 0 | 117 | 80.2 | 45.5 | 1.47 | 93 | — | Foam Rises |
| 3 | 21.6 | 0.05 | 0.2 | 0 | 117.5 | 94.2 | 30.3 | 2.03 | 92 | — | Foam Improves |
| 4 | 21.0 | 0 | 0.3 | 0 | 117.2 | 94.2 | 39.9 | 1.62 | 93 | — | Foam Improves |
| 5 | 21.1 | 0.05 | 0.3 | 0 | 117.5 | 109.0 | 27.4 | 1.47 | 95 | 101 | Looks Good |
| 6 | 20.8 | 0 | 0.4 | 0 | 116 | 106.2 | 27.1 | 1.62 | 91 | 97 | Unstable |
| 7 | 21.6 | 0.05 | 0.4 | 0 | 116.5 | 106.9 | 27.1 | 1.62 | 84 | — | Unstable |
| 8 | 22.7 | 0 | 0.5 | 0 | 116 | 108.3 | 24.2 | 1.80 | 84 | 99 | Unstable |
| 9 | 17.8 | 0 | 0.5 | 1.98 | 115 | 62.6 | 25.9 | 1.35 | 59 | — | Verge of Prefoaming |
| 10 | 18.5 | 0.05 | 0.5 | 2.06 | 116.5 | 70.3 | 24.5 | 1.62 | 43 | 55 | Looks Good |

(1) parts of 80/20 by weight mixture of FC-12/FC-11 mixed in per hundred parts of polymer
(2) parts of magnesium oxide mixed in per hundred parts of polymer
(3) parts of Dow Corning epoxy functional silane Z-6040 mixed in per hundred parts of polymer
(4) parts of methanol mixed in per hundred parts of polymer
(5) temperature of gel coming out of the die in degrees centigrade
(6) pressure at the extruder discharge in kilograms per square centimeter
(7) density of foam body in kilograms per cubic meter measured in about one month
(8) cell size in millimeter in horizontal direction determined per ASTM D-3576
(9) open cell in percent determined per ASTM D-2856-A
(10) minimum or maximum volume of foam body during aging as percentage of initial volume measured within about five minutes after extrusion
(11) appearance of foam body being extruded out of the die orifice small amount of talcum powder (0.2–0.7 pph) was added for cell size control. Optionally, a small amount (0.05 pph) of magnesium oxide was put in to catalyze the epoxy/acid reaction.

An 80/20 by weight mixture of FC-12/FC-11 (dichlorodifluoromethane/trichloromonofluoromethane) was employed as the blowing agent in the tests of this example. Methanol was fed in the extruder in a mixture with the blowing agent in tests designed to see its effect as the reaction-delaying agent. Formulations in the test of this example are presented in Table A.

The temperatures maintained at extruder zones were approximately 120° C. at feeding zone, 190° C. at melting and metering zone and also at mixing zone. The temperature of cooling zone was maintained so that the temperature of the polymer/blowing agent mixture could reach an optimum uniform temperature for foaming which was in the range of 115°–119° C. as shown in Table A. The die gap was fixed at 0.120" (3.0 mm) throughout the tests. In some tests, foam dimensional stability at ambient temperature was followed with specimens cut to about 7 inches (17.8 cm) in length. The foam cross sectional area varied with the formulation but most had width in the range of 1.0–1.5" (2.54–3.8 cm) and thickness 0.7–1.0" (1.78–2.54 cm).

Figure 2:
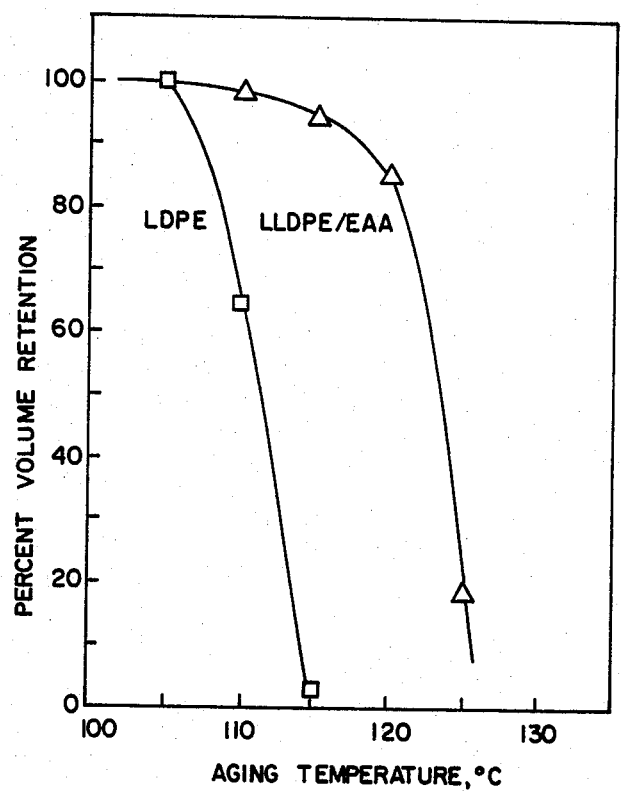
FIG. 2 is a graph of aging temperature versus percent volume retention for a comparative branched-chain olefin and linear olefin blend foam.

Table I shows the results of the tests. With no crosslinking, the resultant foam totally collapsed. Addition of epoxy functional silane made the foam rise. Magnesium oxide assisted the crosslinking reaction. At an epoxy silane level of 0.3 pph with magnesium oxide incorpo- The heat distortion characteristics of the blend foam produced in Test 10 were tested against a foam produced from a branched-chain low density polyethylene having 2.3 melt index and 0.921 g/cc density. The foams were placed in an oven for one hour at temperatures between about 100° and 130° C. The percent volume retention of the foams was measured as the ratio of final to initial foam volume. FIG. 2 illustrates the high temperature stability of those foams. The blend foam of Test 10 had superior high temperature performance.

EXAMPLE II

The apparatus and operating procedures used for the tests in this example were the same as in Example I. The polymer feedstock was a 50/50 by weight blend of a granular linear low density polyethylene having a 1.0 melt index (ASTM D-1238-79 Condition E) and a 0.935 gm/cc density and a granular copolymer of acrylic acid and ethylene (2.0 melt index and 6.5% acrylic acid). A small amount of talc (0.05 pph) was added to the blend for cell size control.

The blend was fed into the extruder at 10 pounds (4.55 kg) per hour. Dichlorodifluoromethane was used as the blowing agent and was injected into the extruder at a rate of about 1.72 pounds (0.78 kg) per hour. The crosslinking agent was hexamethoxymethylmelamine (HMMM) which was dissolved in a 50% solution with methylene chloride. The HMMM solution was injected into the extruder by a syringe pump. The temperatures maintained in the extruders zones were as follows: 150° C. at the feeding zone, 180° C. at the melting and metering zone, and 200° C. at the mixing zone. The temperature of the cooling zone was adjusted so that the polymer gel could be cooled to about 125° C. throughout the tests. The die gap was varied to test its effect on foam appearance.

temperatures will reduce the open cell content of the foam.

EXAMPLE III

The apparatus, operating procedures, polymer blend, blowing agent, and cell size control agent used in this example were the same as in Example II. A multiepox-

TABLE II

| TEST NO. | BA LEVEL (1) | HMMM LEVEL (2) | GEL TEMP. (3) | DIE GAP (4) | DIE PRES. (5) | EXTRUDER PRESS. (6) | FOAM THICK (7) | FOAM WIDTH (8) | FOAM DENSITY (9) | CELL SIZE (10) | OPEN CELL (11) | FOAM APPEAR. (12) |
|---|---|---|---|---|---|---|---|---|---|---|---|---|
| 1 | 17.1 | — | 126 | 0.25 | 24.6 | 63.3 | 1.57 | 2.03 | 290 | 1.35 | 67.6 | C |
|   |      |   |     | 0.23 | 26.0 | 65.0 | 1.57 | 2.03 | 211 | 1.81 | 71.6 | C |
|   |      |   |     | 0.20 | 28.5 | 67.5 | 1.35 | 2.34 | 167 | 1.81 | 74.1 | C |
|   |      |   |     | 0.18 | 32.3 | 73.8 | 1.19 | 3.05 | 86.8 | 2.03 | 83.7 | PC |
|   |      |   |     | 0.15 | 35.2 | 75.9 | 1.07 | 2.92 | 91.0 | 2.03 | 83.1 | PC |
|   |      |   |     | 0.13 | 40.8 | 80.9 | 1.02 | 3.28 | 55.9 | 1.81 | 86.6 | PC |
|   |      |   |     | 0.10 | 48.5 | 91.4 | 0.84 | 3.30 | 56.0 | 1.62 | 86.4 | PC |
| 2 | 17.2 | 0.1 | 125 | 0.25 | 45.0 | 106 | 1.68 | 3.25 | 47.2 | 1.62 | 89.0 | PC |
|   |      |   |     | 0.23 | 47.8 | 112 | 1.73 | 3.48 | 34.7 | 1.47 | 88.9 | G |
|   |      |   |     | 0.22 | 49.2 | 113 | 1.63 | 3.45 | 34.1 | 1.62 | 90.0 | G |
|   |      |   |     | 0.20 | 52.0 | 114 | 1.60 | 3.48 | 34.4 | 1.47 | 88.4 | E |
|   |      |   |     | 0.19 | 55.5 | 122 | 1.57 | 3.56 | 31.2 | 1.81 | 87.2 | E |
| 3 | 17.2 | 0.125 | 125 | 0.25 | 46.4 | 117 | 2.11 | 3.45 | 30.6 | 1.25 | 91.1 | G |
|   |      |   |     | 0.23 | 46.8 | 119 | 1.88 | 3.48 | 29.3 | 1.81 | 87.7 | E |
|   |      |   |     | 0.22 | 51.0 | 124 | 1.83 | 3.56 | 29.1 | 1.62 | 89.3 | E |
|   |      |   |     | 0.20 | 54.1 | 130 | 1.78 | 3.61 | 29.5 | 1.62 | 79.7 | E |
|   |      |   |     | 0.19 | 59.4 | 137 | 1.60 | 3.65 | 29.3 | 1.81 | 87.8 | E |

(1) parts of dichlorodifluoromethane mixed in per hundred parts of polymer
(2) parts of effective hexamethoxymethylmelamine mixed in per hundred parts of polymer
(3) temperature in degrees centigrade to which the gel was cooled down prior to foam expansion
(4) gap of die opening in centimeters at which samples were taken
(5), (6) pressure in kilograms per square centimeter at the die and at the extruder discharge, respectively
(7), (8) thickness and width of foam body in centimeters measured within about five minutes after extrusion
(9) density of foam body in kilograms per cubic meter measured in about one month
(10) cell size in millimeter in horizontal direction determined per ASTM D-3576
(11) open cell content in percent determined per ASTM D-2856-A
(12) subjective judgment of foam appearance, C = total collapse, PC = partial collapse, G = good, E = excellent As can be seen from Table II, without the addition of a crosslinking agent, no foams could be produced at any die gap. All foams totally or partially collapsed under those conditions. However, the addition of HMMM had a dramatic effect on foam appearance. At an HMMM level of 0.1 pph, excellent quality foams were produced at die gaps of 0.08 inches (2.0 mm) and smaller. At somewhat higher HMMM levels, the die gap could be opened even wider without incurring prefoaming of the polymer gel. While all foams contained relatively high levels of open cells, the foam appearance and structure was otherwise good. Such open-celled foams are useful in sound insulation applications. It was found that operation at slightly lower gel yfunctional novolac resin, designated D.E.N. 431 from Dow Chemical Company, was employed as the crosslinking agent. The epoxy resin was dissolved in a 50% solution with methylene chloride and injected into the extruder. A small amount (0.05 pph) of magnesium oxide was mixed into the polymer feedstock to catalyze the crosslinking reaction. Blowing agent was injected at a uniform rate of 1.67 pounds (0.76 kg) per hour.

As shown by Table III, the epoxy resin crosslinking agent raises the die pressure and improves foam appearance. At a level of 0.125 pph of the epoxy resin, the die was opened as wide as 0.13 inches (0.33 cm) while still producing a good quality foam.

TABLE III

| TEST NO. | BA LEVEL (1) | D.E.N. 431 LEVEL (2) | GEL TEMP. (3) | DIE GAP (4) | DIE PRES. (5) | EXTRUDER PRESS. (6) | FOAM THICK (7) | FOAM WIDTH (8) | FOAM DENSITY (9) | CELL SIZE (10) | OPEN CELL (11) | FOAM APPEAR. (12) |
|---|---|---|---|---|---|---|---|---|---|---|---|---|
| 1 | 16.7 | 0.1 | 125 | 0.25 | 34.5 | 90.7 | 1.78 | 3.30 | 39.4 | 1.81 | 8.88 | G |
|   |      |     |     | 0.23 | 35.9 | 94.9 | 1.65 | 3.40 | 40.2 | 1.81 | 89.6 | G |
|   |      |     |     | 0.22 | 40.8 | 101  | 1.65 | 3.35 | 35.2 | 1.47 | 93.0 | G |
|   |      |     |     | 0.20 | 43.0 | 101  | 1.63 | 3.43 | 36.2 | 1.62 | 89.1 | G |
|   |      |     |     | 0.19 | 45.7 | 106  | 1.52 | 3.43 | 33.1 | 1.35 | 90.4 | E |
|   |      |     |     | 0.18 | 48.5 | 109  | 1.50 | 3.45 | 33.0 | 1.62 | 89.6 | E |
| 2 | 16.7 | 0.125 | 125 | 0.33 | 42.2 | 120 | 2.44 | 3.45 | 35.1 | 2.03 | 88.1 | E |
|   |      |     |     | 0.30 | 43.6 | 123 | 2.39 | 3.40 | 35.7 | 2.03 | 87.5 | E |
|   |      |     |     | 0.28 | 46.4 | 127 | 2.29 | 3.43 | 34.9 | 1.81 | 87.7 | E |
|   |      |     |     | 0.25 | 48.5 | 127 | 2.26 | 3.40 | 33.8 | 1.62 | 89.7 | E |
|   |      |     |     | 0.23 | 51.3 | 131 | 2.18 | 3.38 | 32.5 | 2.03 | 87.9 | E |

TABLE III-continued

| TEST NO. | BA LEVEL (1) | D.E.N. 431 LEVEL (2) | GEL TEMP. (3) | DIE GAP (4) | DIE PRES. (5) | EXTRUDER PRESS. (6) | FOAM THICK (7) | FOAM WIDTH (8) | FOAM DENSITY (9) | CELL SIZE (10) | OPEN CELL (11) | FOAM APPEAR. (12) |
|---|---|---|---|---|---|---|---|---|---|---|---|---|
| | | | | 0.20 | 55.5 | 137 | 2.11 | 3.30 | 33.5 | 1.81 | 85.7 | E |

(1) parts of dichlorodifluoromethane mixed in per hundred parts of polymer
(2) parts of epoxy novolac resin D.E.N. 431 produced by Dow Chemical Company mixed in per hundred parts of polymer
(3) temperature in degrees centigrade to which the gel was cooled down prior to foam expansion
(4) gap of die opening in centimeters at which samples were taken
(5), (6) pressure in kilograms per square centimeter at the die and at the extruder discharge, respectively
(7), (8) thickness and width of foam body in centimeters measured within about five minutes after extrusion
(9) density of foam body in kilograms per cubic meter measured in about one month
(10) cell size in millimeter in horizontal direction determined per ASTM D-3576
(11) open cell content in percent determined per ASTM D-2856-A
(12) subjective judgment of foam appearance; C = total collapse, PC = partial collapse, G = good, E = excellent

EXAMPLE IV

The apparatus, operating procedures, polymer blend, and cell size control agent used in this example were the same as in Example III. As the crosslinking agent, the epoxyfunctional silane used in Example I was used. A small amount (0.05 pph) of magnesium oxide was added to catalyze the crosslinking reaction.

As shown in Table IV, the addition of 0.2 pph of the epoxyfunctional silane crosslinking agent provides improvement in the foamability of the polymer blend. Under the conditions of this example, the addition of 0.35 pph of the silane resulted in melt fracture (over crosslinking) of the polymer blend.

What is claimed is:

1. An expandable polymeric composition comprising a blend of a linear olefin polymer and a crosslinkable polymer having one or more carboxylic acid, amide, amine, or hydroxyl functional groups; a crosslinking agent selected from the group consisting of epoxy-functional silanes, amino-functional silanes, organofunctional alkoxy silanes, amines, multiepoxyfunctional resins, and titanates; and a volatile blowing agent.

2. The composition of claim 1 in which said linear olefin polymer is low density polyethylene and is present in an amount of from 5 to 95% by weight and said crosslinkable polymer is present in an amount of from 95 to 5% by weight.

TABLE IV

| TEST NO. | BA LEVEL (1) | Z-6040 LEVEL (2) | GEL TEMP. (3) | DIE GAP (4) | DIE PRES. (5) | EXTRUDER PRESS. (6) | FOAM THICK (7) | FOAM WIDTH (8) | FOAM DENSITY (9) | CELL SIZE (10) | OPEN CELL (11) | FOAM APPEAR. (12) |
|---|---|---|---|---|---|---|---|---|---|---|---|---|
| 1 | 17.3 | 0.2 | 125 | 0.25 | 38.0 | 103 | 1.83 | 3.23 | 28.5 | 1.47 | 50.1 | G |
| | | | | 0.23 | 42.2 | 110 | 1.80 | 3.30 | 26.7 | 1.25 | 91.1 | E |
| | | | | 0.22 | 45.0 | 112 | 1.78 | 3.33 | 25.8 | 1.47 | 85.1 | E |
| | | | | 0.20 | 46.4 | 119 | 1.70 | 3.35 | 26.3 | 1.47 | 74.1 | E |
| | | | | 0.19 | 48.5 | 120 | 1.63 | 3.35 | 24.8 | 1.81 | 68.4 | E |
| | | | | 0.18 | 52.0 | 123 | 1.47 | 3.33 | 23.7 | 1.16 | 59.9 | E |
| 2 | 17.2 | 0.35 | 125 | 0.51 | 29.5 | 134 | 1.91 | 2.61 | 42.3 | 0.52 | 90.7 | melt fracture |

(1) parts of dichlorodifluoromethane mixed in per hundred parts of polymer
(2) parts of Dow Corning epoxy functional silane mixed in per hundred parts of polymer
(3) temperature in degrees centigrade to which the gel was cooled down prior to foam expansion
(4) gap of die opening in centimeters at which samples were taken
(5), (6) pressure in kilograms per square centimeter at the die and at the extruder discharge, respectively
(7), (8) thickness and width of foam body in centimeters measured within about five minutes after extrusion
(9) density of foam body in kilograms per cubic centimeter measured in about one month
(10) cell size in millimeter in horizontal direction determined per ASTM D-3576
(11) open cell content in percent determined per ASTM D-2856-A
(12) subjective judgment of foam appearance; C = total collapse, PC = partial collapse, G = good, E = excellent While the methods and compositions herein described constitute preferred embodiments of the invention, it is to be understood that the invention is not limited to these precise methods and compositions, and that changes may be made in either without departing from the scope of the invention, which is defined in the appended claims.

3. The composition of claim 1 in which said crosslinkable polymer is an ethylene-acrylic acid copolymer.

4. The composition of claim 3 in which said crosslinking agent is an epoxyfunctional silane.

5. The composition of claim 3 in which said crosslinking agent is a multiepoxyfunctional resin.

* * * * *